(12) United States Patent
Hirata

(10) Patent No.: US 8,037,498 B2
(45) Date of Patent: *Oct. 11, 2011

(54) RECEPTION METHOD, RECEPTION DEVICE, TRANSMISSION METHOD, TRANSMISSION DEVICE, TRANSMISSION/RECEPTION METHOD, TRANSMISSION/RECEPTION DEVICE

(75) Inventor: Shinichi Hirata, Kanagawa (JP)

(73) Assignee: Sony Corporation, Tokyo (JP)

( * ) Notice: Subject to any disclaimer, the term of this patent is extended or adjusted under 35 U.S.C. 154(b) by 1649 days.

This patent is subject to a terminal disclaimer.

(21) Appl. No.: 10/029,238

(22) Filed: Dec. 28, 2001

(65) Prior Publication Data

US 2003/0079231 A1    Apr. 24, 2003

Related U.S. Application Data

(62) Division of application No. 09/039,922, filed on Mar. 16, 1998.

(30) Foreign Application Priority Data

Mar. 18, 1997   (JP) .................................... 9-064230

(51) Int. Cl.
  *H04N 5/50*      (2006.01)
  *H04N 7/173*     (2006.01)
  *G06F 15/02*     (2006.01)

(52) U.S. Cl. ............... 725/58; 725/39; 725/51; 348/460

(58) Field of Classification Search .................... 725/58, 725/51, 39; 348/460–461
See application file for complete search history.

(56) References Cited

U.S. PATENT DOCUMENTS

| 4,713,780 | A | | 12/1987 | Schultz et al. ................ 709/206 |
| 4,713,837 | A | | 12/1987 | Gordon ......................... 379/106 |
| 4,908,707 | A | * | 3/1990 | Kinghorn ..................... 348/460 |
| 5,475,835 | A | | 12/1995 | Hickey .......................... 395/600 |
| 5,543,933 | A | * | 8/1996 | Kang et al. ...................... 386/83 |
| 5,548,635 | A | | 8/1996 | Bradley et al. ................ 379/102 |
| 5,552,833 | A | * | 9/1996 | Henmi et al. ................. 348/460 |
| 5,555,346 | A | | 9/1996 | Gross et al. ..................... 706/45 |
| 5,565,929 | A | | 10/1996 | Tanaka .......................... 345/565 |

(Continued)

FOREIGN PATENT DOCUMENTS

EP    0 805 594 A2    5/1997

(Continued)

OTHER PUBLICATIONS

(Flite, Franklin Jr.; What's Behind the Microsoft At Work Facade; Electronic Engineerin TimesO, 1994.

*Primary Examiner* — Pankaj Kumar
*Assistant Examiner* — Reuben M Brown
(74) *Attorney, Agent, or Firm* — Oblon, Spivak, McClelland, Maier & Neustadt, L.L.P.

(57) ABSTRACT

An electronic mail on which a control command is interpolated is transmitted through a public line, received by a modem section of a gate way, converted to a digital data, and supplied to the control section. A CPU of the control section stores the received electronic mail in a RAM, and extracts the control command contained in the electronic mail. The CPU supplies a control signal corresponding to the control command to an interface section. The interface section controls an IR transmission section to transmit a signal corresponding to the control signal supplied from the CPU or outputs a signal through a connection line, and controls a video deck.

35 Claims, 10 Drawing Sheets

U.S. PATENT DOCUMENTS

| | | | |
|---|---|---|---|
| 5,585,838 A * | 12/1996 | Lawler et al. | 725/54 |
| 5,781,901 A | 7/1998 | Kuzma | 707/10 |
| 5,856,852 A * | 1/1999 | Huh | 348/460 |
| 5,905,442 A | 5/1999 | Moosebrook et al. | 340/825.06 |
| 5,938,757 A | 8/1999 | Bertsch | 340/825.06 |
| 5,956,487 A | 9/1999 | Venkatraman et al. | 340/825.06 |
| 5,982,445 A | 11/1999 | Eyer et al. | 348/461 |
| 6,047,260 A | 4/2000 | Levinson | 705/9 |
| 6,606,128 B2 * | 8/2003 | Hanafee et al. | 348/563 |
| 2003/0031465 A1 * | 2/2003 | Blake | 386/83 |
| 2006/0015906 A1 * | 1/2006 | Boyer et al. | 725/51 |

FOREIGN PATENT DOCUMENTS

JP   10-247345   *   9/1998

* cited by examiner

TO:home-server@bar.sony.co.jp
From:foo@sm.sony.co.jp
Cc:mother@bar.sony.co.jp
Subject:VIDEO Reservation VIDEO Reservation

| DATE | FROM | TO | CH | SPEED |
|---|---|---|---|---|
| 10 | 11:00 | 12:00 | 3 | SP |

CONTENT LISTED ABOVE IS RESERVED

TO:foo@sm.sony.co.jp
From:home-server@bar.sony.co.jp
Subject:VIDEO Reservation

SET CONTENT
DATE    FROM    TO      CH      SPEED
 10     11:00   12:00    3      SP

IT IS IMPOSSIBLE TO RESERVE BECAUSE RESERVATION DATA TRANSMITTED LISTED ABOVE OVERLAPS PARTIALLY ON DATE OF RESERVATION NO. 1

FIG. 7

TO:foo@sm.sony.co.jp
From:home-server@bar.sony.co.jp
Subject:VIDEO Reservation

RESERVATION NO.: 2
SET CONTENT

| DATE | FROM | TO | CH | SPEED |
|------|-------|-------|----|-------|
| 10 | 11:00 | 12:00 | 3 | SP |

RECORDING IS RESERVED AS LISTED ABOVE

TO:foo@sm.sony.co.jp

From:home-server@bar.sony.co.jp

Subject:VIDEO Confirm

SET CONTENT OF RECORDING RESERVATION IS LISTED BELOW

RESERVATION NO. : 1

| DATE | FROM | TO | CH | SPEED |
|------|------|------|----|-------|
| 10 | 9:00 | 10:00 | 1 | LP |

RESERVATION NO. : 2

| DATE | FROM | TO | CH | SPEED |
|------|------|------|----|-------|
| 10 | 11:00 | 12:00 | 3 | SP |

RECEPTION METHOD, RECEPTION DEVICE, TRANSMISSION METHOD, TRANSMISSION DEVICE, TRANSMISSION/RECEPTION METHOD, TRANSMISSION/RECEPTION DEVICE

BACKGROUND OF THE INVENTION

Description of Related Art

Heretofore, conventional electric appliances such as television receivers and video decks have employed a control method that an operation button provided on an appliance body or remote controller is operated desirably.

Further, it is possible to operates as desired an electric appliance while a user leaves them without access by using a timer function to execute at a prescribed time an operation set by way of button operation.

Recently, it has been possible to control an electric appliance such as a video deck installed in user's house by way of interactive operation from the outside, for example, using a tone signal through a telephone line.

However, an electric appliance which is operated by operating an operation button provided on a remote controller or appliance body is disadvantageous in that a user can not operates the electric appliance from the outside of the house.

Further, an electric appliance which can be operated using timer function are also disadvantageous in that a user can not change setting of the timer from the outside of the house if the setting of the appliance is wanted to be changed.

An electric appliance which can be controlled through a telephone line in interactive mode is also disadvantageous in that it takes a long time to control the electric appliance because it is required to operate a push button in response to an audio message from the reception side (electric appliance). Further in the case that a plurality of electric appliances is controlled from the outside, a plurality of telephone lines is required individually for respective electric appliances to operate these electric appliances by way of the same manner, therefore high installation cost is disadvantageous.

The present invention is accomplished in view of such problems, it is the object of the present invention to provide a method for controlling from the outside simply and quickly an electric appliance installed in a house.

SUMMARY OF THE INVENTION

In the reception device described in the present invention, a reception means receives an electronic mail transmitted through a network, an extraction means extracts a control command interpolated in the electronic mail received by the reception means, and a control means controls a prescribed electric appliance dependently on the control command extracted by the extraction means. For example, the reception means receives an electronic mail transmitted from the transmission side through the Internet, the extraction means extracts the control command for reservation of a recording on a video deck interpolated on the electronic mail received by the reception means, and the control means sets the recording reservation on the video deck corresponding to the control command extracted by the extraction means.

In the reception method described in the present invention, an electronic mail transmitted through a network is received in the reception step, a control command interpolated in the electronic mail received by the reception means is extracted in the extraction step, and a prescribed electric appliance is controlled dependently on the control command extracted by the extraction means in the control step. For example, an electronic mail transmitted from the transmission side through the Internet is received in the reception step, the control command for reservation of a recording on a video deck interpolated on the electronic mail received in the reception step is extracted in the extraction step, and the recording reservation is set corresponding to the control command extracted in the extraction step in the control step.

In the transmission device described in the present invention, an electronic mail input means inputs an electronic mail, an addition means adds an control command for controlling a prescribed electric appliance on the electronic mail inputted from the electronic mail input means, and a transmission means transmits the electronic mail on which the control command is added by the addition means through a network. For example, the addition means adds the control command for reserving a recording on a video deck on the electronic mail inputted from the electronic mail input means, and the transmission means transmits the electronic mail on which the control command is added by the addition means to the reception side through the Internet.

In the transmission method described in the present invention, an electronic mail is inputted in an electronic mail input step, an control command for controlling a prescribed electric appliance is added in an addition step on the electronic mail inputted in the electronic mail input step, and a the electronic mail on which the control command is added in the addition step is transmitted through a network in a transmission step. For example, the control command for reserving a recording on an video deck is added in the addition step on the electronic mail inputted in the electronic mail input step, and the electronic mail on which the control command is added in the addition step is transmitted to the reception side through the Internet in the transmission step.

In the transmission/reception device described in the present invention, on the transmission side, an electronic mail input means receives an electronic mail, an addition means adds an control command for controlling a prescribed electric appliance on the electronic mail inputted from the electronic mail input means, and a transmission means transmits the electronic mail on which the control command is added by the addition means through a network, and on the reception side, a reception means receives an electronic mail transmitted through a network, an extraction means extracts a control command interpolated in the electronic mail received by the reception means, and a control means controls a prescribed electric appliance dependently on the control command extracted by the extraction means. For example, on the transmission side, the addition means adds the control command for reservation of a recording on a video deck on the electronic mail inputted from the electronic mail input means, and the transmission means transmits the electronic mail on which the control command is added by the addition means to the reception side through the Internet. On the reception side, the reception means receives the electronic mail transmitted from the transmission side through the Internet, the extraction means extracts the control command for reserving a recording on a video deck interpolated on the electronic mail received by the reception means, and the control means sets the recording reservation on the video deck corresponding to the control command extracted by the extraction means.

In the transmission/reception method described in the present invention, on the transmission side, an electronic mail is inputted in an electronic mail input step, an control command for controlling a prescribed electric appliance is added in the addition step on the electronic mail inputted in the electronic mail input step, and the electronic mail on which the control command is added in the addition step is transmitted through a network in a transmission step, and on the reception side, an electronic mail transmitted through a network is received in a reception step, a control command interpolated in the electronic mail received in the reception step is extracted in the extraction step, and a prescribed electric appliance is controlled in a control step dependently on the control command extracted in the extraction step. For example, on the transmission side, the control command for reservation of a recording on a video deck is added in the addition step on the electronic mail inputted in the electronic mail input step, and the electronic mail on which the control command is added in the addition step is transmitted to the reception side though the Internet in the transmission step. On the reception side, the electronic mail transmitted from the transmission side through the Internet is received in the reception step, the control command for reservation of a recording on a video deck interpolated on the electronic mail received in the reception step is extracted in the extraction step, and the recording reservation on the video deck is set in the control step corresponding to the control command extracted in the extraction step.

According to the reception device and reception method described in the present invention, because an electronic mail transmitted through a network is received, a control command interpolated on the received electronic mail is extracted, and a prescribed electric appliance is controlled corresponding to the extracted control command, it is possible to control correctly the electric appliance remotely.

According to the transmission method described in the present invention, because an electric mail is inputted, a control command for controlling a prescribed electric appliance is added on the input electronic mail, and the electronic mail on which the control command is added is transmitted through a network, it is possible to control the electric appliance rapidly.

According to the transmission/reception method described in the present invention, because, on the transmission side, an electronic mail is inputted, a control command for controlling a prescribed electric appliance is added on the input electronic mail, and the electronic mail on which the control command is added is transmitted through a network, and on the reception side, the electronic mail transmitted through the network is received, the control command is extracted from the received electronic mail, and the prescribed electric appliance is controlled dependently on the extracted control command, is possible to control the electric appliance using a single transmission medium.

DETAILED DESCRIPTION OF THE PREFERRED EMBODIMENTS

Figure 1:
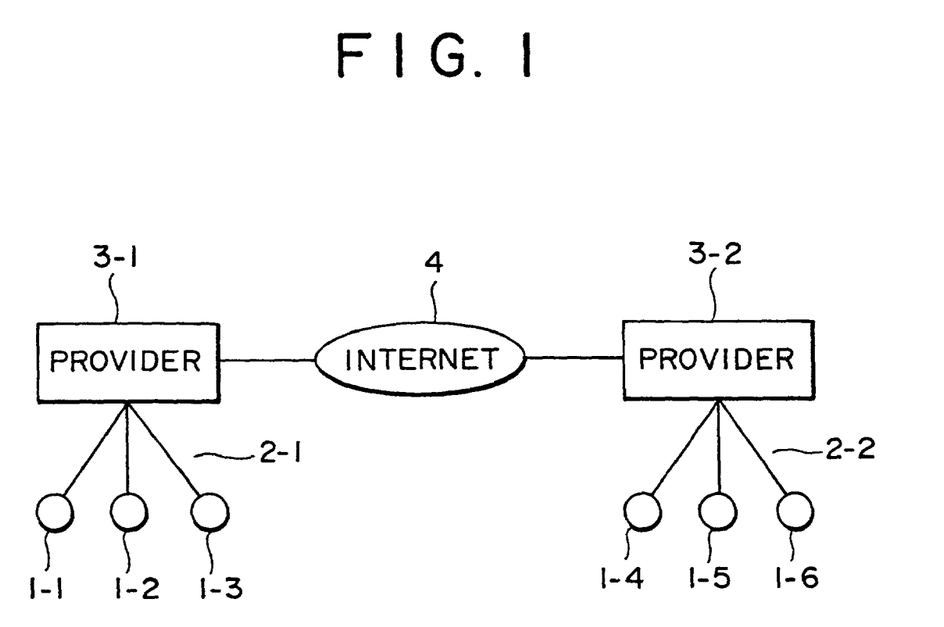
FIG. 1 is a diagram for illustrating an exemplary structure of an embodiment of the present invention.

FIG. 1 is a diagram for illustrating a structure of an embodiment of the present invention. In this drawing, terminals 1-1 to 1-6 are connected to providers 3-1 and 3-2 through public lines (analog line or ISDN line) 2-1 and 2-2, and a terminal can transmits/receives information between other terminals under the management of the providers 3-1 and 3-2.

When a terminal 1-1 to 1-6 makes a call through the public lines 2-1 and 2-2, the providers 3-1 and 3-2 connect (dial-up IP connection) based on TCP/IP (Transmission Control Protocol/Internet Protocol) between terminals who made the call.

The Internet connects providers 3-1 and 3-2 each other, and communicate information between providers based on the protocol called as the above-mentioned TCP/IP.

Figure 2:
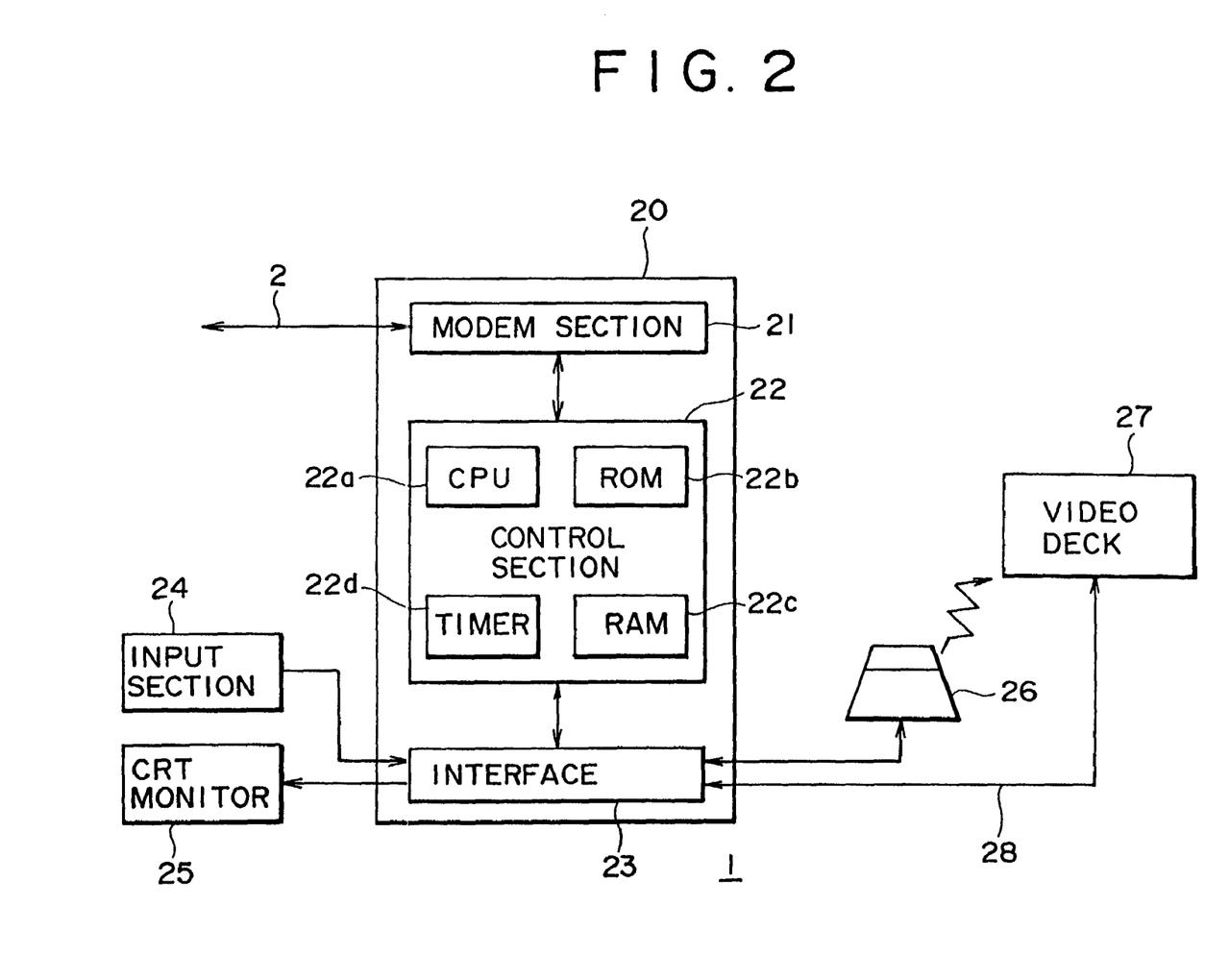
FIG. 2 is a block diagram for illustrating an exemplary detailed structure of a terminal 1 shown in FIG. 1.

FIG. 2 is a block diagram for illustrating an exemplary electrical structure of a terminal 1-1 to 1-6 shown in FIG. 1. In the drawing, a gate way 20 can transmit/receive information between other terminals through the public line 2.

An input section 24 (electronic mail input means) comprises, for example, a key board and mouse, and operated when a certain information is inputted to the gate way 20. A CRT (Cathode Ray Tube) monitor 25 displays a received information or an information inputted from the input section 24.

An IR (Infra Red) transmission section 26 irradiates infrared rays dependently on the control by means of the gate way, and controls a video deck 27.

A connection line 28 is a signal line based on a home bus such as Wired CIRCS or LANC and served for transmission/reception of information between the gate way 20 and video deck 27.

The video deck 27 performs an operation such as recording, playing back, or stopping in response to an control signal transmitted through the IR transmission section 26 or connection line 28.

The gate way 20 comprises a modem section 21 (reception means, transmission means), control section 22, and interface section 23 (control means).

The modem section 21 converts a signal (analog signal) on the public line 2 and a signal (digital signal) in the control section 22 alternately so that it is possible to transmit/receive information between the public line 2 and the control section described hereinafter.

The control section 22 comprises a CPU (Central Processing Unit) 22a, (extraction means, control means, electronic mail generation means, and addition means), ROM (Read Only Memory) 22b, RAM (Random Access Memory) 22c, and timer 22d.

The CPU 22a performs various arithmetic operations, and controls various components. The ROM 22b stores programs which the CPU executes and data which is required for processing. The RAM 22c stores temporarily data which are generated when the CPU 22a executes an arithmetic operation. The timer 22d generates the current time and outputs it.

Next, the operation of the above-mentioned embodiment is described.

It is assumed that a terminal installed in the house of a user is the terminal 1-1, and a terminal installed in the place where the user is present currently (for example, a company) is the terminal 1-4.

In such situation, the case that the user transmits an electronic mail from the terminal 1-4 in the company to the terminal 1-1 in the house to reserve a recording on the video deck is described.

Figure 3:
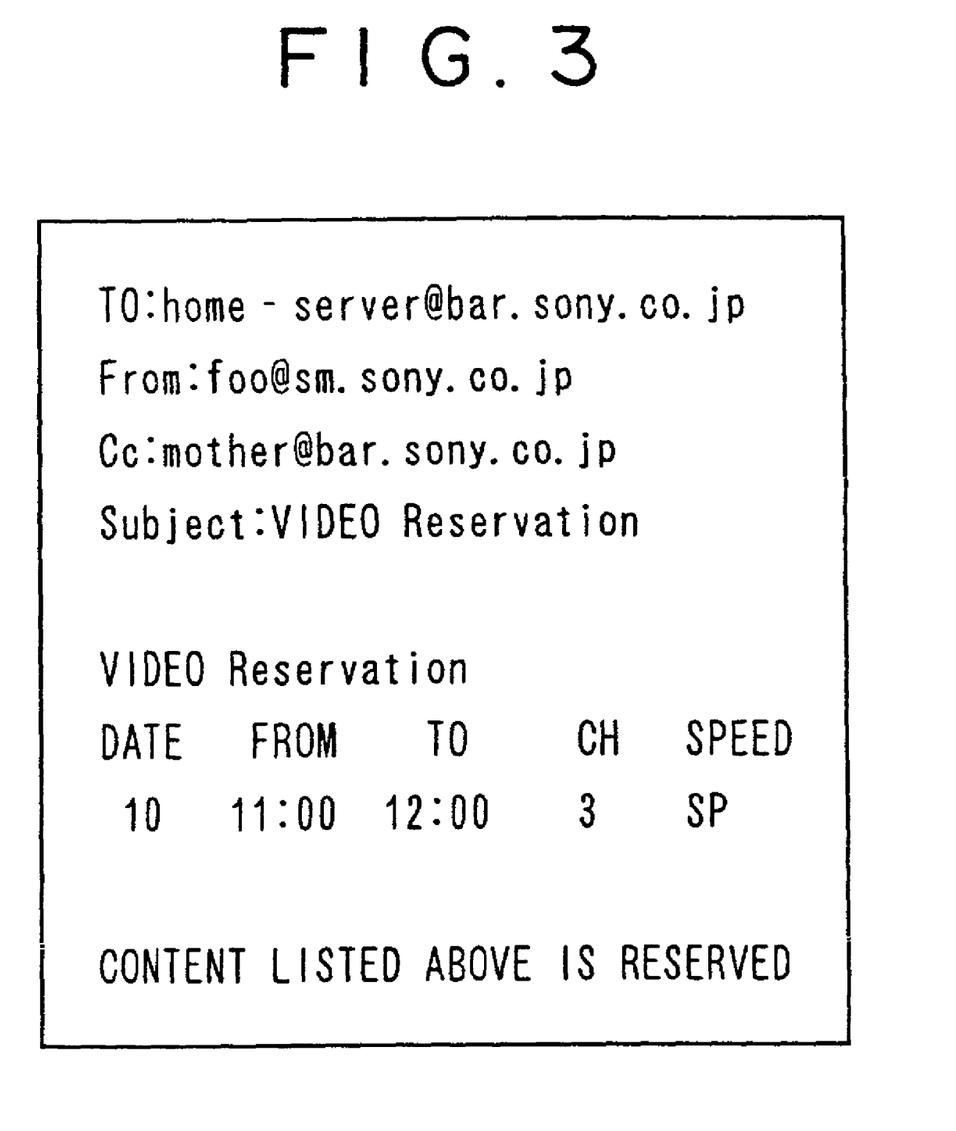
FIG. 3 is a diagram for illustrating an electronic mail for reservation on a video transmitted from a reception side.

It is assumed that the user operates the input section 24 of the terminal 1-4 in the company and inputs an electronic mail as shown in FIG. 3. An address of the electronic mail appears in the first line. "home-serversubsequent to "TO:" is the address of this electronic mail. In detail, "bar.sony.co.jp" subsequent to "indicates a domain name (domain name of the provider 3-1) and "home-server" antecedent to "indicates a ID mane (ID name of the terminal 3-2).

An addresser is described in the second line. "foo" subsequent to "From" is the ID name of this user in the company, "sm.sony.co.jp" subsequent to "is the domain name (domain name of the provider 3-2).

In this embodiment, an case that the terminals 1-4 to 1-6 are connected to the Internet 4 though the provider 3-2 is described, however, the case that these terminals form a LAN (Local Area Network) and are connected to the Internet 4 through a host computer may be involved.

Figure 4:
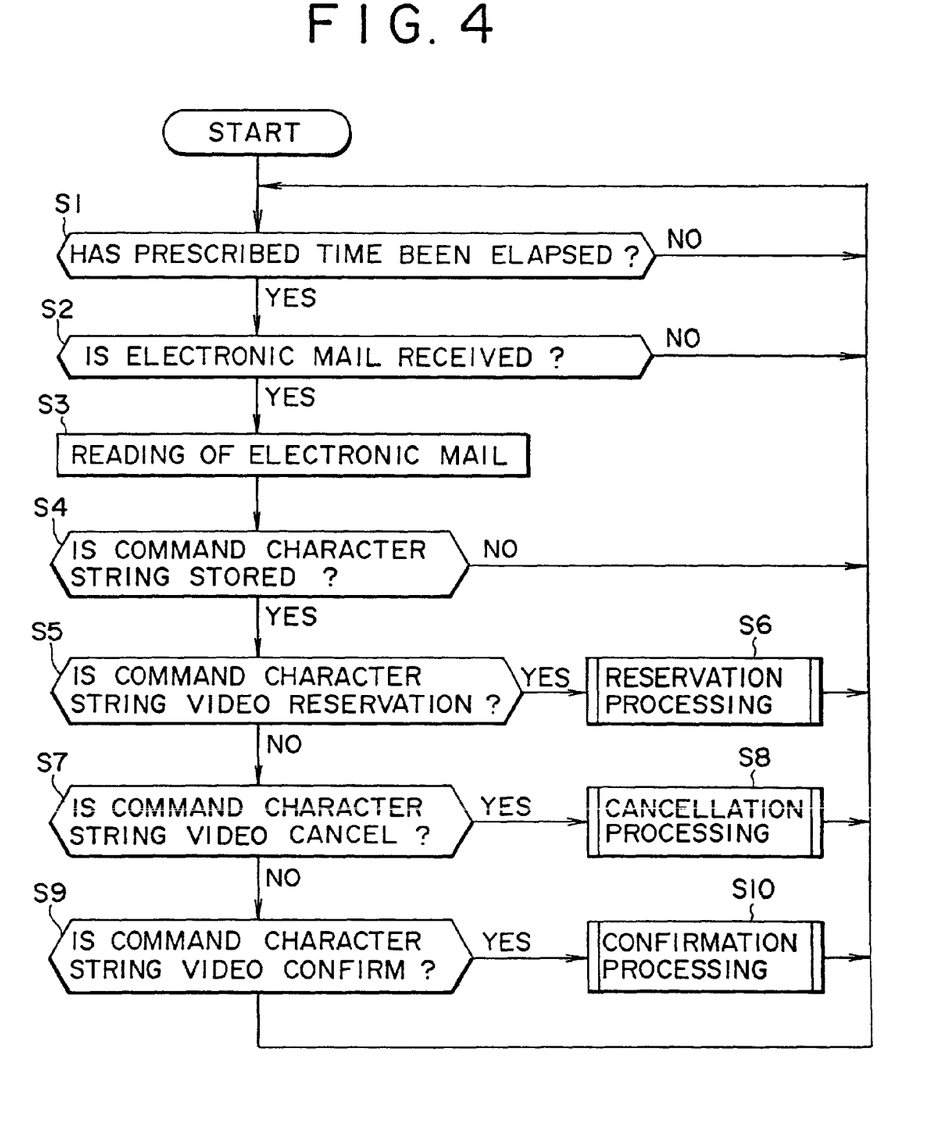
FIG. 4 is a flow chart for describing one example of a processing executed in a control section shown in FIG. 2.

In FIG. 4, the second address of this electronic mail appears in the third line. In this example, "mother" immediately subsequent to "Cc" is the ID name of the second addressee (for example, the ID name of the mother of the user), and "bar.sony.co.jp" subsequent to "indicates the domain name (domain name of the provider 3-1).

In the fourth line, a control command to the gate way 20 is described. In this example, "Video Reservation" is described subsequent to "Subject", this suggests that the electronic mail includes a control command to reserve a recording on the video deck 27.

"Video Reservation" in the fifth line is a control command to reserve a recording on the video deck 27 as described herein above.

Characters in the sixth line specifies respective parameters for reserving a recording. In detail, these characters are parametric definition of values and characters listed in the next seventh line.

Values and characters listed in the seventh line are set values of parameters defined in the sixth line as described herein above. In this example, a recording "on 10-th day (date), 11:00 (FROM) to 12:00 (TO), at the SP (Standard Play) SPEED" is set. The order may be changed desirably.

A message is described in the eighth line. In this example, a message "a program is reserved as described herein above" is described, and a fact that a program is reserved as described herein above on the video deck is informed to the second addressee namely the mother of the user.

The operation of the terminal 1-1 namely the reception side for responding to the transmission of the electronic mail from the terminal 1-4 is described with reference to FIG. 4.

FIG. 4 is a flow chart for describing one example of a processing performed in the terminal 1-1.

As the result of performing the processing, the CPU 22a of the control section 22 judges in the step S1 whether a set time (for example, 10 minutes) elapses. If the judgement result is NO, then the sequence returns to the step S1, the same processing is repeated until the set time elapses. On the other hand, if the judgement result is YES, then the sequence proceeds to the step S3.

In the step S2, the CPU 22a supplies a prescribed control signal to the modem section 21, calls the provider 3-1 through the public line 2, and judges whether an electronic mail addressed to this terminal 1-1 is received. If the judgement result is NO, then the sequence returns to the step S1, and repeats the same processing as described herein above. On the other hand, if the judgement result is YES, then the sequence proceeds to the step S3.

In the step S3, the CPU 22a acquires an electronic mail which the provider 3-1 received, and stores it in the RAM 22c. The sequence proceeds to the step S4.

In the step S4, the CPU 22a reads the electronic mail stored in the RAM 22c successively one line by one line, and judges whether a command character string (character string which contains a control command) is contained. If the judgement result is NO, then the sequence returns to the step S1, and the same processing as described herein above is repeated. On the other hand, if the judgement result is YES, then the sequence proceeds to the step S5. If the judgement result is NO, the electronic mail stored in the RAM 22c can be displayed on the CRT monitor 25 by operating the input section 24.

In the step S4 the judgement result is YES, the sequence proceeds to the step S6, and whether the command character string is "VIDEO Reservation" (video recording reservation) is judged. If the judgement result is NO, then the sequence proceeds to the step S7. On the other hand, if the judgement result is YES, the sequence proceeds to the step S6.

Figure 5:
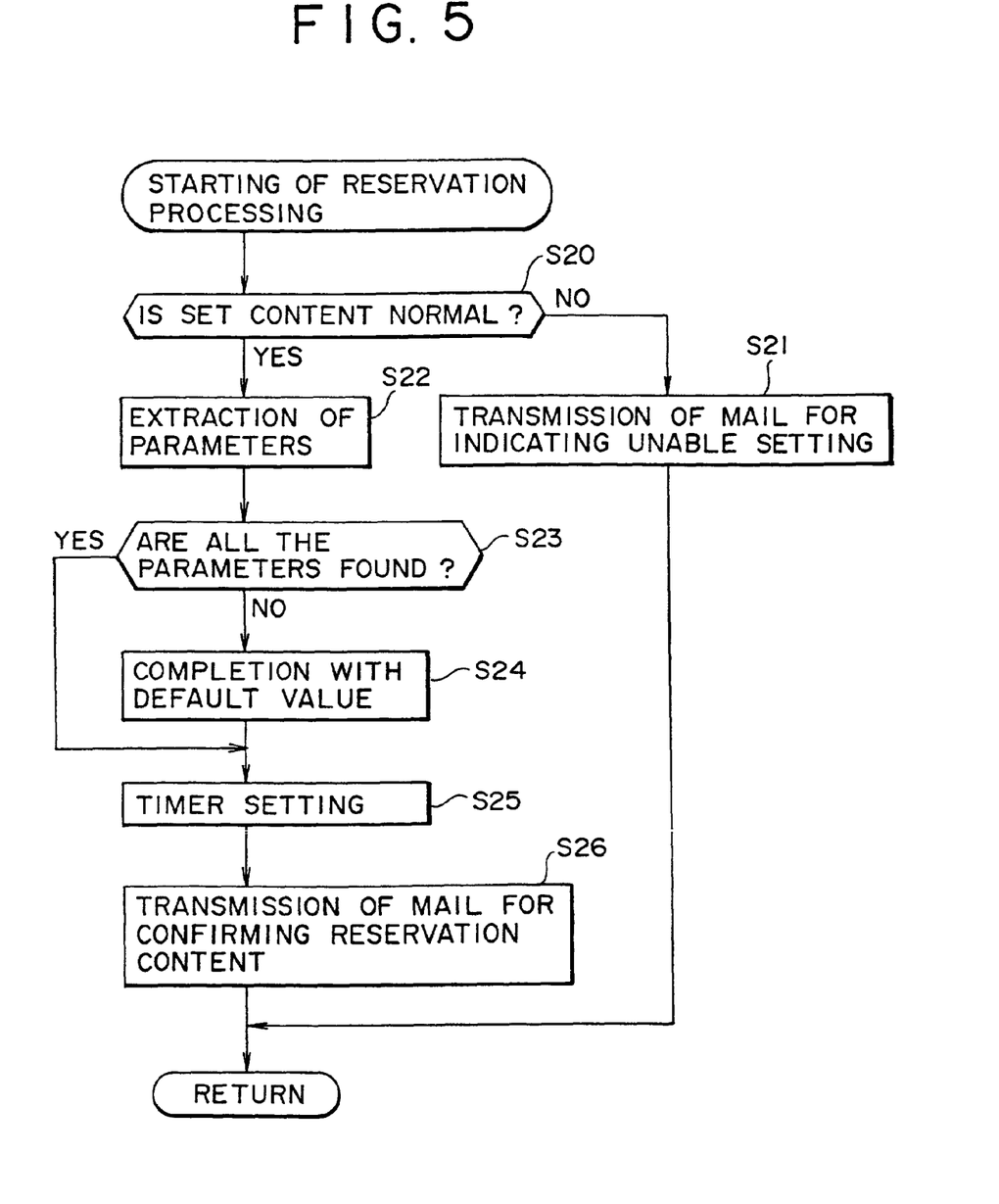
FIG. 5 is a flow chart for describing the detail of a reservation processing shown in FIG. 4.

The step 6 is a sub-routine processing, the detail of the processing is described with reference to FIG. 5. As the result of the processing in the step S6, the processing in the step S20 in FIG. 5 is called and executed. In the processing in the step S20, the CPU 22a judges whether the set content (parameter) of the command character string is normal. In detail, for example, an erroneous data such as that the recording ending time is earlier than the recording starting time, or that the recording time of the previously set recording reservation data overlaps partially on the recording time of the recording reservation data received this time is detected. As the result, if the set content is judged to be not normal (NO), then the sequence proceeds to the step S21, an electronic mail for indicating that the recording reservation is impossible to be set is prepared and transmitted to the terminal 1-4 of the transmission side through the modem 21.

Figure 6:
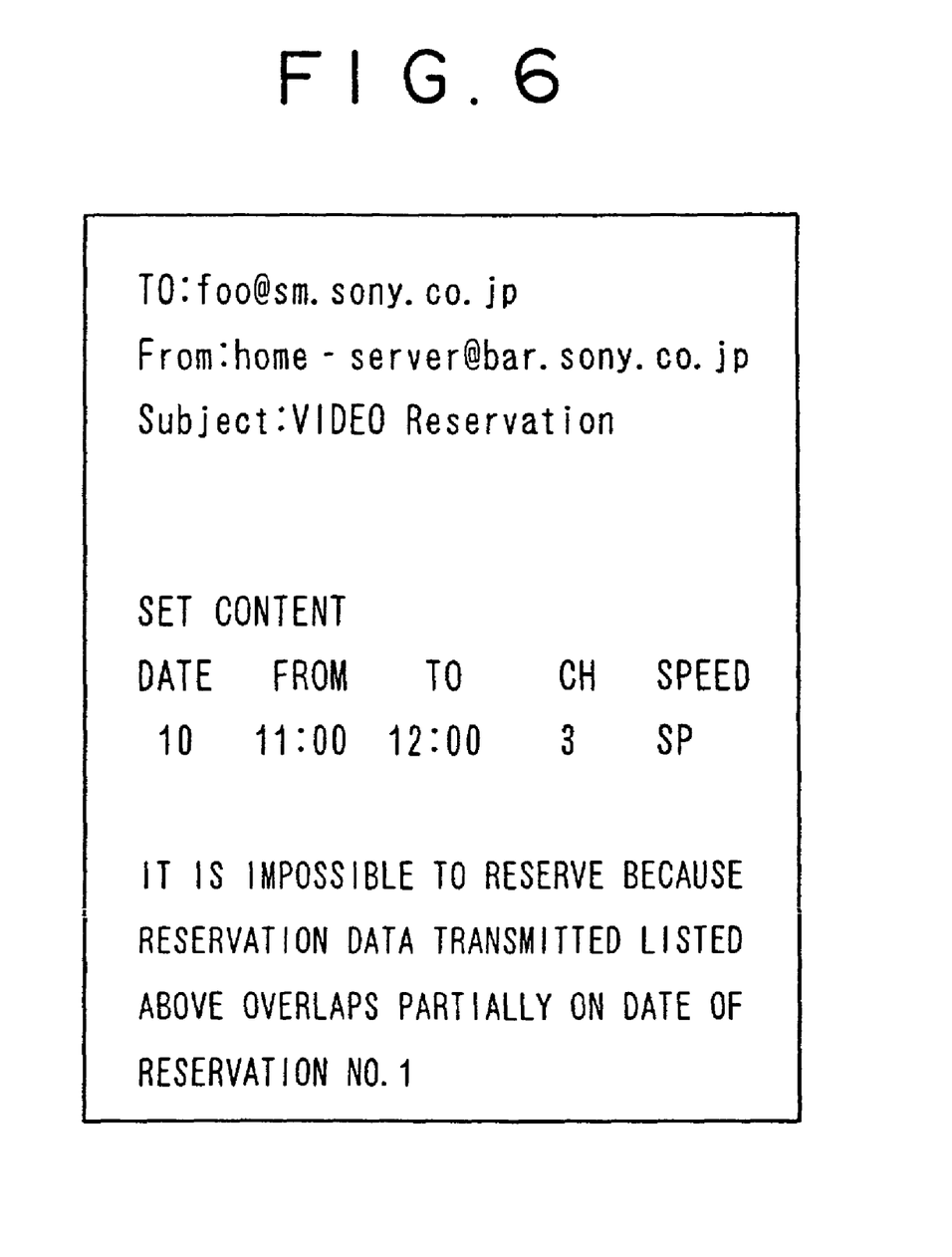
FIG. 6 is an example of an electronic mail transmitted from a reception side when a recording is not reserved normally as the result of a reservation processing shown in FIG. 5.

On an electronic mail shown in FIG. 6, like the above-mentioned case, an address namely the ID name and domain name of the terminal 1-4 is listed in the first line. An address of the addresser namely the ID name and domain name of the terminal 1-1 is listed in the second line. Further in the third line, "VIDEO Reservation" which indicates that this electronic mail relates to an recording reservation on the video is listed.

in the next line, the set content described in the electronic mail shown in FIG. 3 is listed as it is. in the next line, a message which indicates that the setting is impossible because the recording time of the previously set recording reservation data overlaps partially on the recording time of the recording reservation data received this time is listed. Such an electronic mail is generated in the processing in the step S21, and transmitted to the terminal 1-4. Then, the sequence returns to the processing in the step S6 in FIG. 4.

On the other hand, if the set content is judged to be normal (YES) in the step 20, the sequence proceeds to the step S22.

In the step S22, the CPU 22a extracts parameters contained in the recording reservation data, and the sequence proceeds to the step S23.

In the step S23, the CPU 22a judges whether the extracted parameter includes all the parameters. The parameter for a recording reservation should include a recording data (DATE), recording starting time (FROM), recording ending time (TO), recording channel (CH), and recording mode (SPEED). As the judgement result, if not all the parameters are contained (NO), the sequence proceeds to the step S24, deficient parameters are completed with a default value, and the sequence proceeds to the step S25. Herein the default value is set as described herein under.

Recording date: date on which the electronic mail is received. Recording starting time: the time point at which the electronic mail is received. Recording ending time: the time point after 1 hr from the time of reception of the electronic mail. Channel: the favorite channel (previously set channel). Recording mode: LP (Long Play) mode.

Hence, for example, it is assumed that an electronic mail as described herein under is received on 10-th day.
DATE FROM TO CH SPEED 10:00
The recording parameters as described herein under are set.
DATE FROM TO CH SPEED 10:00=10, 10:00, 11:00, 4, LP The above-mentioned default value may be changeable. For example, the recording data may be the next day to the day on which the electronic mail is received, recording starting time may be the time after 10 minutes from the time when the electronic mail is received, recording ending time may be the time after 30 minutes from the recording starting time, and recording mode may be SP (Standard Play). (LP indicates the long time recording mode and SP indicates the standard time recording mode of so-called home VTR (VHS system)).

On the other hand, it is judged in the step S23 that all the parameters are contained, the sequence skips the processing in the step S24, and proceeds to the step S25.

In the step S25, the extracted parameters are stored in a prescribed region of the RAM 22c (in the region where operation time of the timer is set) and the operation of the timer rises to start. Then, the sequence proceeds to the step S26.

Figure 7:
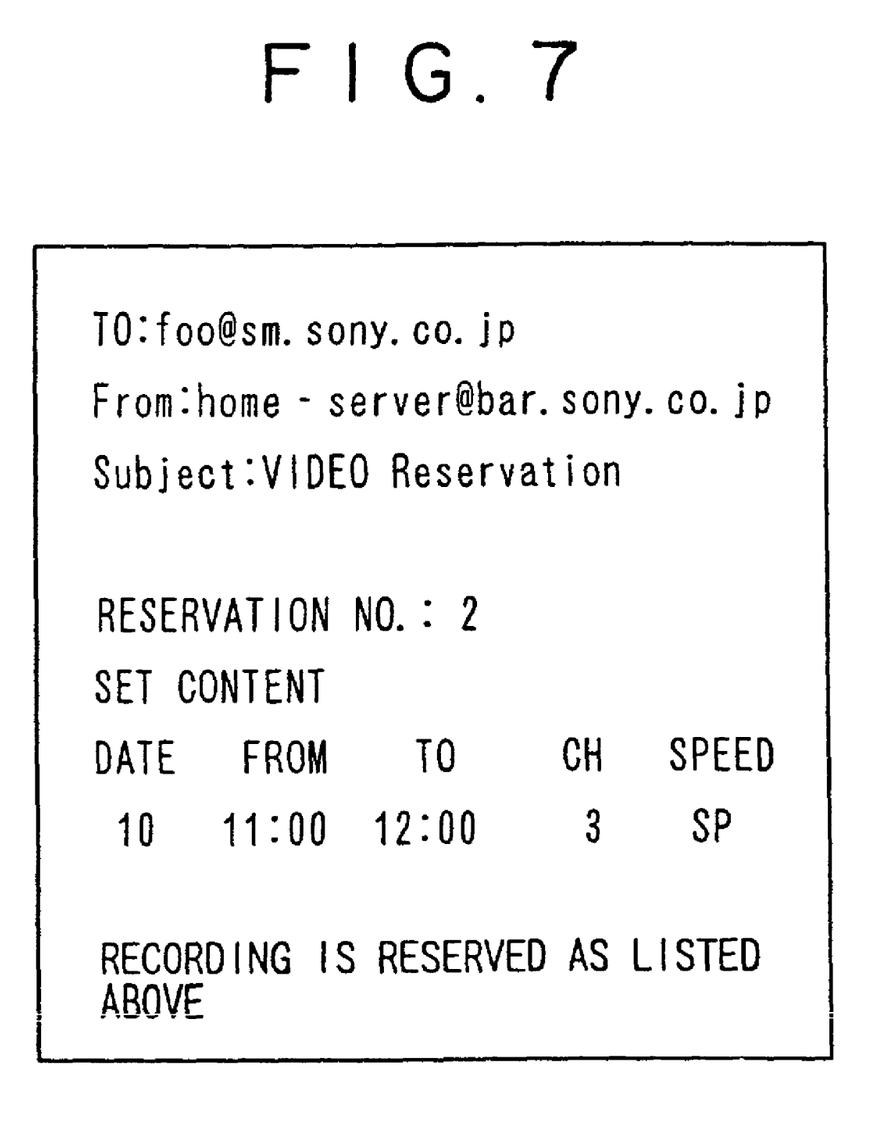
FIG. 7 is an example of an electronic mail transmitted from a reception side when a recording is reserved normally as the result of the reservation processing shown in FIG. 5.

In the step S26, the CPU 22a, for example, generates an electronic mail shown in FIG. 7 in order to confirm the recording reservation content, and transmits it to the terminal 1-4 through the modem section 21. In this embodiment, the addressee, addresser, and title of the electronic mail listed in the first line to third line are the same as those listed in FIG. 6. However, a reservation number is listed in the fourth line, and the listing in the fourth line indicates that the data is received by the terminal 1-1 as the second recording reservation data. In the next line, the set content of the received parameters is listed. In the final line, a message which indicates that the recording of the set content shown in the drawing is reserved is listed. Such an electric mail is transmitted to the terminal 1-4, the user who transmitted the electronic mail of the recording reservation shown in FIG. 3 can recognize that the terminal 1-1 completed the setting normally with reference to the electronic mail shown in FIG. 7.

After completion of the process in the step S26, the sequence returns to the step S6 in FIG. 4. The sequence returns to the step S1, and repeats the same processing as described herein above.

On the other hand, in the processing in the step S5, if the command character string is not "VIDEO Reservation" (NO), the sequence proceeds to the step S7. The CPU 22a judges whether the command character string is "VIDEO Cancel". If the command character string is judged not to be "VIDEO Cancel" (NO), then the sequence proceeds to the step S9. On the other hand, if the command character string is judged to be "VIDEO Cancel" (YES), then the sequence proceeds to the step S8. The processing in the step S8 is a sub-routine, the detail is described with reference to FIG. 8.

Figure 8:
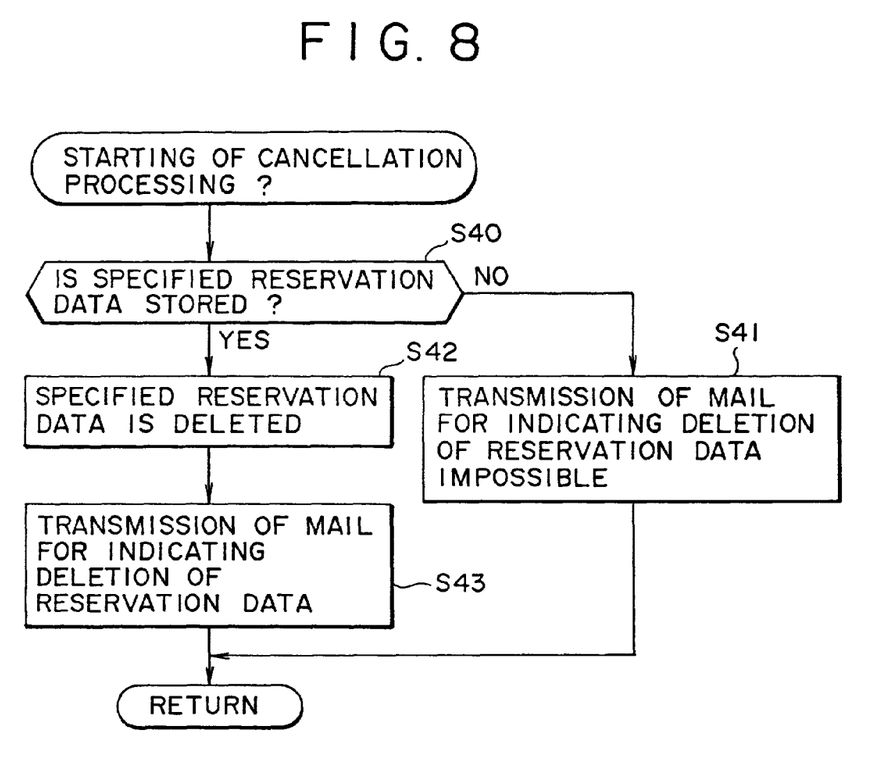
FIG. 8 is an flow chart for describing the detail of a cancellation processing shown in FIG. 4.

FIG. 8 is a flow chart for illustrating the detail of the cancellation processing shown in FIG. 4. In this processing, a recording reservation data previously set is deleted. When this processing is executed, the CPU 22a judges in the step S40 whether the specified recording reservation data (specified to be deleted) is stored in the RAM 22c. As the result, if the specified recording reservation data is judged not to be stored in the RAM 22c (NO), the sequence proceeds to the step S41, and an electronic mail which indicates that it is impossible to delete the specified recording reservation data is transmitted to the terminal 1-4 through the modem 21 as in the step S21 shown in FIG. 5. Then, the sequence returns to the step S8 (return).

On the other hand, if the specified recording reservation data is judged to be stored in the RAM 22c (YES), then the sequence proceeds to the step S42. In the step S42, the CPU 22a deletes the specified recording reservation data from the RAM 22c. The sequence proceeds to the step S43, and an electronic mail which indicates that the reservation data was deleted is transmitted to the terminal 1-4. Then, the sequence returns to the processing in the step S8 shown in FIG. 4 (return). After returning to the processing in the step S8, the sequence returns to the step S1, and repeats the same processing as described herein above.

In the processing in the step S7, if the command character string is judged not to be "VIDEO Cancel" (NO), then the sequence proceeds to the step S9. In the step S9, the CPU 22a judges whether the command character string is "VIDEO Confirm". As the result, if the command character string is judged not to be "VIDEO Confirm" (NO), then the sequence returns to the step S1, and repeats the same processing as described herein above. On the other hand, if the command character string is judged to be "VIDEO Confirm" (YES), then the sequence proceeds to the step S10.

Figure 9:
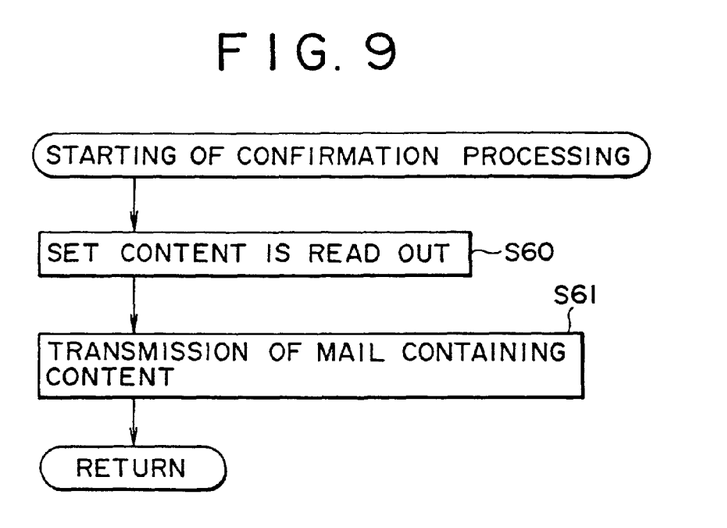
FIG. 9 is a flow chart for describing the detail of a confirmation processing shown in FIG. 4.

The step S10 is a sub-routine for transmitting all the recording reservation data stored in the RAM 22c as an electronic mail, when this processing is executed, the processing shown in FIG. 9 is executed.

When the processing in the step S60 shown in FIG. 9 is executed, the CPU 22a reads out all the recording reservation data stored in the RAM 22c. Then the sequence proceeds to the step S61, the CPU 22a prepares an electronic mail as shown in FIG. 10, and transmits it to the terminal 1-4 through the modem section 21.

Figure 10:
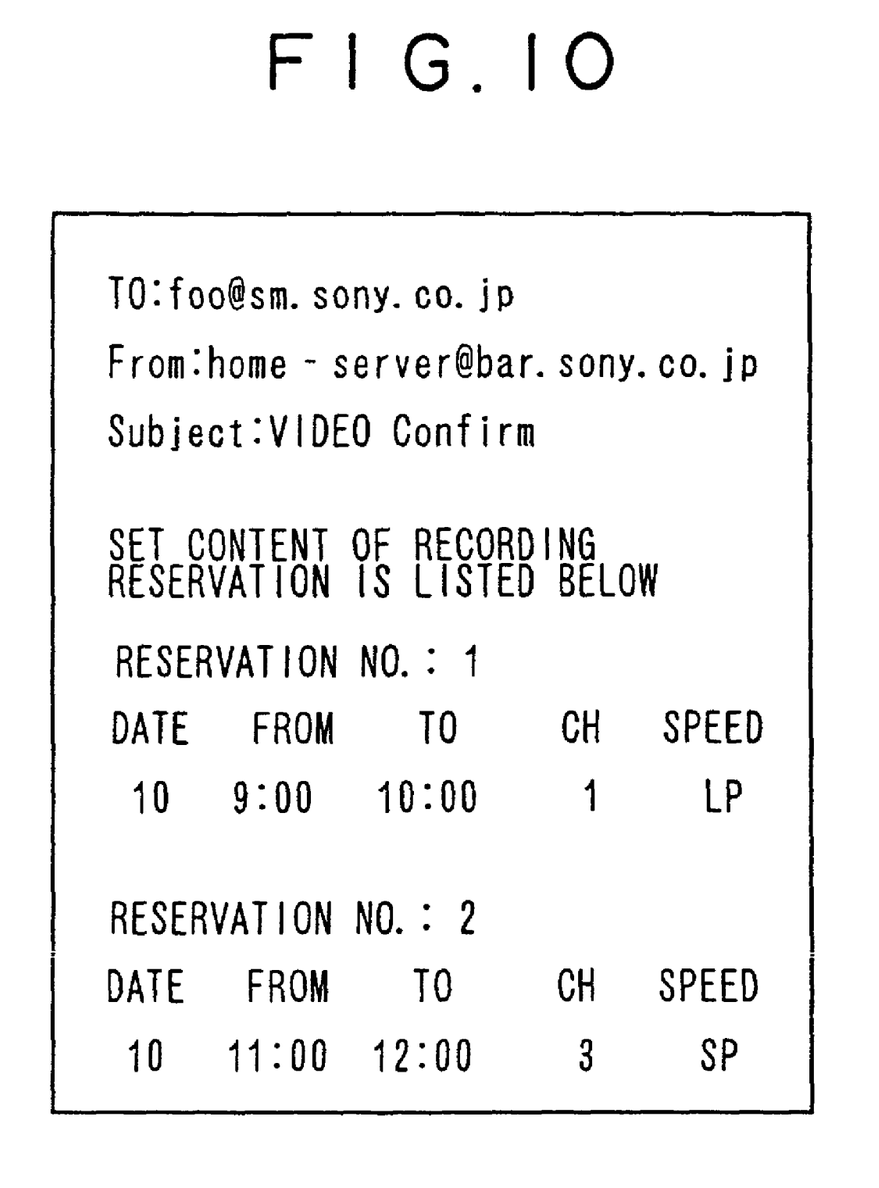
FIG. 10 is a diagram for illustrating one example of an electronic mail transmitted from a reception side as the confirmation processing shown in FIG. 9.

The ID name and domain name of the terminal 1-4 namely the addressee is listed in the first line, ID name and domain name of the terminal 1-1 namely the addresser is listed in the second line of the electronic mail shown in FIG. 10. The purpose of this electronic mail of confirming a recording reservation data on video 27 is described in the third line.

In the fourth line, "the set content of the recording reservation is described in the following" is listed for showing that recording reservation data are listed in the following. The data of reservation number "1" containing recording on 10-th day, from 9:00 to 10:00, at channel 1 in the LP (Long Play) mode is listed, and in the next line, the data of reservation number "2" containing recording on 10-th day, from 11:00 to 12:00, at channel 3, in the SP (Standard Play) mode is listed.

The terminal 1-4 receives the electronic mail described herein above. The user can see the received electronic mail on the CRT monitor 25, and can confirm the recording reservation data set in the terminal 1-1.

After completion of the processing in the step S61 in FIG. 9, the sequence returns to the processing in the step S10 shown in FIG. 4 (return). The sequence returns to the step S1, and repeats the same processing as described herein above.

As the result of the above-mentioned processing, the recording reservation data transmitted from the terminal 1-4 installed outside the house is stored in the RAM 22c of the terminal 1-1 installed inside the house. The terminal 1-1 controls the video deck 27 dependently on the processing shown in FIG. 11, and performs a recording at the time reserved.

Figure 11:
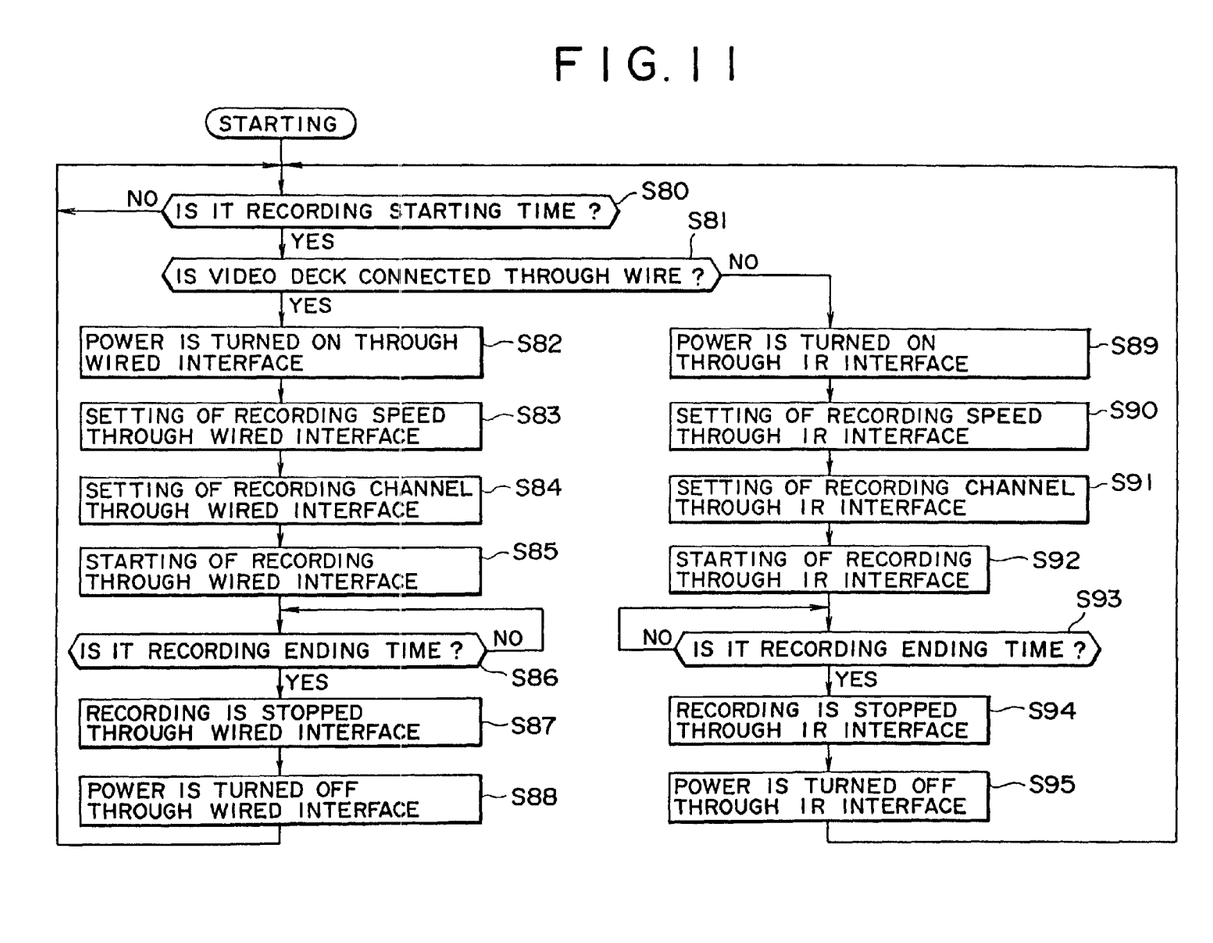
FIG. 11 is a flowchart for describing one example of a processing executed in the control section 22 shown in FIG. 2 when a recording is reserved.

When the processing shown in FIG. 11 is executed, the CPU 22a compares an output data of the timer section 22d with the recording reservation data stored in the RAM 22c, and judges whether the time reaches the recording starting time. If the judgement result is NO, then the sequence returns to the step S80, and repeats the same processing until the time reaches the recording starting time. On the other hand, if the judgement result is YES, then the sequence proceeds to the step 89.

In the step S81, the CPU 22a judges whether the video deck 27 is connected through a wire, that is, the CPU 22a judges whether the video deck 27 is connected to the gate way 20 through the connection line 28. If the judgement result is YES, then the sequence proceeds to the step S82, on the other hand, if the judgement result is NO, then the sequence proceeds to the step S89.

In the embodiment shown in FIG. 2, the video deck 27 is connected to the gate way 20 through the wire, and the IR transmission section 26 for controlling the video deck by way of infrared ray is connected to the gate way 20. In such a case, the connection line with a high transmission rate and high reliability is used preferentially.

In the FIG. 11, if the judgement result is YES in the step S81, then the sequence proceeds to the step S82, the CPU 22a turns the power source of the video deck 27 ON through the wired interface (connection line 28). Then, the sequence proceeds to the step S83, the CPU 22a sets the recording speed in, for example, the SP mode through the wired interface.

In the subsequent step S84, the CPU 22a sets the recording channel on the video deck 27 through the wired interface. Further in the step S85, the CPU 22a transmits a prescribed control signal to the video deck 27 through the wired interface similarly and starts the recording.

In the step S86, the CPU 22a compares the output data of the timer section 22d with the recording reservation data stored in the RAM 22c, and judges whether the time reaches the recording ending time. If the judgement result is NO, then the sequence returns to the step S86, and repeats the same processing until the time reaches the recording ending time. On the other hand, the judgement result is YES, the sequence proceeds to the step S87, and the CPU 22a brought the video deck 27 to a stop through the wired interface. Then, the sequence proceeds to the step S88, the CPU 22a turns the power source of the video deck 27 OFF, and the sequence returns to the step S80, and repeats the same processing as described herein above.

In the step S81, if the CPU 22a judges that the video deck 27 is not connected through the wire, the sequence proceeds to the step S89, then the CPU 22a transmits a prescribed control signal from the IR interface (IR transmission section 26), and turns the power source of the video deck 27 ON.

The sequence proceeds to the step S90, the CPU sets the recording speed through the IR interface.

In the subsequent step S91, the CPU 22a sets the recording channel on the video deck 27 through the IR interface. Further in the step S92, the CPU 22a transmits a prescribed control signal to the video deck 27 through the IR interface, and starts the recording.

In the step S93, the CPU 22a compares the output data of the timer section 22d with the recording reservation data stored in the RAM 22c, and judges whether the time reaches the recording ending time. As the result, if the CPU 22a judges that the time does not reach the recording ending time (NO), the sequence returns to the step S93, and repeats the same processing until the time reaches the recording ending time. On the other hand, if the CPU 22a judges that the time reaches the recording ending time (YES), the sequence proceeds to the step S94, and the CPU 22a brought the video deck 27 to a stop through the IR interface. Then, the sequence proceeds to the step S95, the power source of the video deck is turned OFF, and the sequence returns to the step S80, and repeats the same processing as described herein above.

According to the processing described herein above, it is possible to control the video deck 27 dependently on the recording reservation data stored in the RAM 22c, and record a desired program.

According to the embodiment described hereinbefore, a user who is outside the house can control an electric appliance such as a video deck installed in the user's house, and also possible to confirm the possibility of setting and the set content by way of an electric mail.

In the embodiment described hereinbefore, the case that the video deck 27 is exemplified as an electric appliance to be controlled by the gate way 20 is described, however, the present invention is by no means limited to the case, alternatively, for example, other electric appliances such as an air conditioner or audio device can be controlled.

In the embodiment described hereinbefore, the case that the terminals 1-1 to 1-6 are connected through the Internet 4 and providers 3-1 and 3-2 is described, however, other transmission medium can be used.

What is claimed is:

1. A reception device for controlling a recording module, comprising:
    means for receiving an electronic mail as a formatted file including operating mode information, operation starting time information and operation ending time information of the recording module and being transmitted through a network;
    a central processing unit that extracts at least one text-based control command in said formatted file received by said means for receiving, wherein said text-based control command is in said formatted file to control said recording module; and
    means for controlling that controls said recording module based on said text based control command extracted by said central processing unit, wherein said means for controlling has a timer reservation function, and said means for controlling reserves an operation time of said recording module, said means for controlling judges whether a character string in said electronic mail is a control command, and when a control command is judged to exist in the electronic mail, the means for controlling checks for at least one of a reservation command, a cancellation command, and a confirmation command so as to control said recording module.

2. The reception device according to claim 1, wherein said network is the Internet based on Transmission Control Protocol over Internet Protocol (TCP/IP).

3. The reception device according to claim 1, wherein said operation time of said recording module is stored in memory.

4. The reception device according to claim 1, wherein said recording module is a video recording module.

5. The reception device according to claim 1, wherein said recording module is a television program recording module.

6. A reception device for controlling a recording module, comprising:
   means for receiving an electronic mail as a formatted file including operating mode information, operation starting time information and operation ending time information of the recording module and being transmitted through a network;
   a central processing unit that extracts at least one text-based control command in said formatted file received by said means for receiving, wherein said text-based control command is in said formatted file to control said recording module; and
   means for controlling that controls said recording module based on said text based control command extracted by said central processing unit, wherein said means for controlling has a timer reservation function, and said means for controlling reserves an operation time of said recording module, further comprising both Infra-Red and direct transmission interfaces to said recording module, said means for controlling judges whether a character string in said electronic mail is a control command, and when a control command is judged to exist in the electronic mail, the means for controlling checks for at least one of a reservation command, a cancellation command, and a confirmation command so as to control said recording module.

7. A reception device for controlling a recording module, comprising:
   a receiver configured to receive an electronic mail as a formatted file including operating mode information, operation starting time information and operation ending time information of the recording module and being transmitted through a network;
   a central processing unit programmed to extract at least one text-based control command in said formatted file received by said receiver, wherein said text-based control command is in said formatted file to control said recording module; and
   a controller that controls said recording module based on said text based control command extracted by said central processing unit wherein said controller has a timer reservation function, and said controller reserves an operation time of said recording module, said controller judges whether a character string in said electronic mail is a control command, and when a control command is judged to exist in the electronic mail, the controller checks for at least one of a reservation command, a cancellation command, and a confirmation command so as to control said recording module.

8. The reception device according to claim 7, wherein said network is the Internet based on Transmission Control Protocol over Internet Protocol (TCP/IP).

9. The reception device according to claim 7, wherein said operation time of said recording module is stored in memory.

10. The reception device according to claim 7, wherein said recording module is a video recording module.

11. The reception device according to claim 7, wherein said recording module is a television program recording module.

12. The reception device according to claim 7, wherein said receiver is a modem.

13. A reception device for controlling a recording module, comprising:
   a receiver configured to receive an electronic mail as a formatted file including operating mode information, operation starting time information and operation ending time information of the recording module and being transmitted through a network;
   a central processing unit programmed to extract at least one text-based control command in said formatted file received by said receiver, wherein said text-based control command is in said formatted file to control said recording module; and
   a controller that controls said recording module based on said text based control command extracted by said central processing unit wherein said controller has a timer reservation function, and said controller reserves an operation time of said recording module, further comprising both Infra-Red and direct transmission interfaces to said recording module, said controller judges whether a character string in said electronic mail is a control command, and when a control command is judged to exist in the electronic mail, the controller checks for at least one of a reservation command, a cancellation command, and a confirmation command so as to control said recording module.

14. A reception method for controlling a recording module, comprising the steps of:
   receiving an electronic mail as a formatted file including operating mode information, operation starting time information and operation ending time information of the recording module and being transmitted through a network;
   extracting at least one text-based control command in said formatted file received in said step of receiving, wherein said text-based control command is in said formatted file to control said recording module; and
   controlling with a controller said recording module based on said text based control command extracted by said step of extracting, wherein said step of controlling controls a timer reservation function and reserves an operation time of said recording module, said controller judges whether a character string in said electronic mail is a control command, and when a control command is judged to exist in the electronic mail, the controller checks for at least one of a reservation command, a cancellation command, and a confirmation command so as to control said recording module.

15. The reception method according to claim 14, wherein said network is the Internet based on Transmission Control Protocol over Internet Protocol (TCP/IP).

16. The reception method according to claim 14, wherein said operation time of said recording module is stored in memory.

17. The reception method according to claim 14, wherein said recording module is a video recording module.

18. The reception method according to claim 14, wherein said recording module is a television program recording module.

19. A transmission/reception system for controlling a recording module, comprising:
   means for transmitting from a first location an electronic mail as a formatted file including operating mode information, operation starting time information and operation ending time information of the recording module and at least one text-based control command to control said recording module through a network;
   means for receiving said formatted file;

a central processing unit that extracts said text-based control command in said formatted file received by said means for receiving; and means for controlling that controls said recording module based on said text-based control command extracted by said central processing unit, wherein said means for controlling has a timer reservation function, and said means for controlling reserves an operation time of said recording module, said means for receiving, means for extracting, means for controlling, and recording module being at a common second location that is different than said first location, said means for controlling judges whether a character string in said electronic mail is a control command, and when a control command is judged to exist in the electronic mail, the means for controlling checks for at least one of a reservation command, a cancellation command, and a confirmation command so as to control said recording module.

20. The transmission/reception system according to claim 19, wherein said network is the Internet based on Transmission Control Protocol over Internet Protocol (TCP/IP).

21. The transmission/reception system according to claim 19, wherein said operation time of said recording module is stored in memory.

22. The transmission/reception system according to claim 19, wherein said recording module is a video recording module.

23. The transmission/reception system according to claim 19, wherein said recording module is a television program recording module.

24. A transmission/reception system for controlling a recording module, comprising:
a transmitter at a first location configured to transmit an electronic mail as a formatted file including operating mode information, operation starting time information and operation ending time information of the recording module and at least one text-based control command to control said recording module through a network;
a receiver configured to receive said formatted file;
a central processing unit programmed to extract said text-based control command in said formatted file received by said receiver; and
a controller that controls said recording module based on said text-based control command extracted by said central processing unit, wherein said controller has a timer reservation function, and said controller reserves an operation time of said recording module, wherein said receiver, processor, controller and recording module being at a common second location that is different than the first location, said controller judges whether a character string in said electronic mail is a control command, and when a control command is judged to exist in the electronic mail, the controller checks for at least one of a reservation command, a cancellation command, and a confirmation command so as to control said recording module.

25. The reception device according to claim 24, wherein said network is the Internet based on Transmission Control Protocol over Internet Protocol (TCP/IP).

26. The reception device according to claim 24, wherein said operation time of said recording module is stored in memory.

27. The reception device according to claim 24, wherein said recording module is a video recording module.

28. The reception device according to claim 24, wherein said recording module is a television program recording module.

29. The reception device according to claim 24, wherein said receiver is a modem.

30. The reception device according to claim 24, further comprising both Infra-Red and direct transmission interfaces to said recording module.

31. A transmission/reception method for controlling a recording module, comprising the steps of:
transmitting from a first location an electronic mail as a formatted file including operating mode information, operation starting time information and operation ending time information of the recording module and at least one text-based control command to control said recording module through a network;
receiving said formatted file at a second location that is different than the first location;
extracting said text-based control command in said formatted file received by said step of receiving; and
controlling with a controller said recording module based on said text based control command extracted by said step of extracting, wherein said step of controlling has a timer reservation function, and said step of controlling reserves an operation time of said recording module, said recording module being at said second location, said controller judges whether a character string in said electronic mail is a control command, and when a control command is judged to exist in the electronic mail, the controller checks for at least one of a reservation command, a cancellation command, and a confirmation command so as to control said recording module.

32. The transmission/reception method according to claim 31, wherein said network is the Internet based on Transmission Control Protocol over Internet Protocol TCP/IP.

33. The transmission/reception method according to claim 31, wherein said operation time of said recording module is stored in memory.

34. The transmission/reception method according to claim 31, wherein said recording module is a video recording module.

35. The transmission/reception method according to claim 31, wherein said recording module is a television program recording module.

* * * * *